（12）United States Patent
Bernheim Brush et al.

(10) Patent No.: US 9,244,888 B2
(45) Date of Patent: Jan. 26, 2016

(54) INFERRING PLACEMENT OF MOBILE ELECTRONIC DEVICES

(71) Applicant: Microsoft Technology Licensing, LLC, Redmond, WA (US)

(72) Inventors: Alice Jane Bernheim Brush, Bellevue, WA (US); T. Scott Saponas, Seattle, WA (US); Jason Wiese, Pittsburg, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/841,221

(22) Filed: Mar. 15, 2013

(65) Prior Publication Data

US 2014/0274159 A1 Sep. 18, 2014

(51) Int. Cl.

| H04M 3/00 | (2006.01) |
|---|---|
| H04W 24/00 | (2009.01) |
| H04M 1/00 | (2006.01) |
| H04M 1/66 | (2006.01) |
| G06F 17/18 | (2006.01) |

(Continued)

(52) U.S. Cl.
CPC ........... *G06F 17/18* (2013.01); *H04M 1/72569* (2013.01); *H04W 64/00* (2013.01); *H04M 1/7253* (2013.01); *H04M 2250/12* (2013.01)

(58) Field of Classification Search
CPC .................. H04M 1/72519; H04M 1/72577
USPC ................ 455/550.1, 418, 414.1, 411, 456.1, 455/456.3, 566; 702/127
See application file for complete search history.

(56) References Cited

U.S. PATENT DOCUMENTS

2006/0022822 A1 2/2006 Wong et al.
2006/0167647 A1 7/2006 Krumm et al.
(Continued)

FOREIGN PATENT DOCUMENTS

EP 2364004 A1 9/2011
EP 2530915 A2 12/2012

OTHER PUBLICATIONS

Tsai, M.-C., F.-C. Chou, Y.-F. Kao, K.-C. Yang, M. Chen, Polite ringer II: A ringtone interaction system using sensor fusion, Proc. of the 13th Int'l Conf. on Ubiquitous Computing, UbiComp 2011, Beijing, China, Sep. 17-21, 2011, pp. 567-568.

(Continued)

*Primary Examiner* — Dung Hong
(74) *Attorney, Agent, or Firm* — Steve Wight; Cassandra T. Swain; Micky Minhas

(57) ABSTRACT

A "Placement Detector" enables handheld or mobile electronic devices such as phones, media players, tablets, etc., to infer their current position or placement. Placement inference is performed by evaluating one or more sensors associated with the device relative to one or more trained probabilistic models to infer device relative to a user. Example placement inferences include, but are not limited to, inferring whether the device is currently in a user's pocket, in a user's purse (or other carrying bag or backpack), in a closed area such as a drawer or box, in an open area such as on a table, indoors, outdoors, etc. These types of placement inferences facilitate a wide range of automated user-device interactions, including, but not limited to, placement-dependent notifications, placement-dependent responses to various inputs, prevention of inadvertent "pocket dialing," prevention of inadvertent power cycling of devices, lost or misplaced device location assistance, etc.

20 Claims, 5 Drawing Sheets

(51) Int. Cl.
*H04W 64/00* (2009.01)
*H04M 1/725* (2006.01)

(56) References Cited

U.S. PATENT DOCUMENTS

| | | | |
|---|---|---|---|
| 2006/0276234 A1* | 12/2006 | Kang | G06F 17/214 455/566 |
| 2007/0075965 A1* | 4/2007 | Huppi | H04M 1/72563 345/156 |
| 2008/0119217 A1 | 5/2008 | Coxhill | |
| 2008/0158185 A1* | 7/2008 | Westerman | 345/173 |
| 2010/0317332 A1 | 12/2010 | Bathiche et al. | |
| 2010/0317400 A1 | 12/2010 | Bivens et al. | |
| 2011/0090626 A1* | 4/2011 | Hoellwarth et al. | 361/679.01 |
| 2011/0273378 A1* | 11/2011 | Alameh | H04M 1/72569 345/173 |
| 2011/0287754 A1* | 11/2011 | Schlueter | H04M 1/67 455/418 |
| 2012/0252495 A1* | 10/2012 | Moeglein | G01S 19/26 455/456.3 |
| 2012/0265482 A1* | 10/2012 | Grokop | G01S 5/16 702/141 |
| 2012/0280917 A1 | 11/2012 | Toksvig et al. | |
| 2013/0328842 A1* | 12/2013 | Barnhoefer | G09G 3/3406 345/207 |

OTHER PUBLICATIONS

McGew, Matt., "How to Avoid iPhone Pocket Dialing", Retrieved at <<http://www.ehow.com/how_8743097_avoid-iphone-pocket-dialing.html>>, Retrieved Date: Feb. 9, 2013, pp. 2.

Dey, et al., "Getting Closer: An Empirical Investigation of the Proximity of Users to their Smart Phones", Retrieved at <<http://www.mediateam.oulu.fi/publications/pdf/1432.pdf>>, In Proceedings of the 13th International Conference on Ubiquitous Computing, Sep. 17, 2011, pp. 10.

Hall, et al., "The WEKA Data Mining Software: An Update", Retrieved at <<http://www.cs.waikato.ac.nz/~eibe/pubs/weka_update.pdf>>, In ACM SIGKDD Explorations Newsletter, vol. 11, Issue 1, Jun. 2009, pp. 9.

Harrison, et al., "Lightweight Material Detection for Placement-Aware Mobile Computing", Retrieved at <<http://citeseerx.ist.psu.edu/viewdoc/download?doi=10.1.1.170.3184&rep=rep1&type=pdf>>, In Proceedings of the 21st Annual ACM Symposium on User Interface Software and Technology, Oct. 19, 2008, pp. 4.

Ichikawa, et al., "Where's the Phone? A Study of Mobile Phone Location in Public Spaces", Retrieved at <<http://ieeexplore.ieee.org/stamp/stamp.jsp?tp=&arnumber=1656800>>, In 2nd International Conference on Mobile Technology, Applications and Systems, Nov. 15, 2005, pp. 8.

Kunze, et al., "Where am I: Recognizing On-Body Positions of Wearable Sensors", Retrieved at <<http://eis.comp.lancs.ac.uk/fileadmin/relate/publication/2005-Where.pdf>>, In Proceedings of the First International Conference on Location- and Context-Awareness, May 12, 2005, pp. 12.

Kunze, et al., "Symbolic Object Localization Through Active Sampling of Acceleration and Sound Signatures", Retrieved at <<http://www.cs.washington.edu/education/courses/cse590u/07au/papers/kunze.pdf>>, In Proceedings of the 9th International Conference on Ubiquitous Computing, Sep. 16, 2007, pp. 18.

Miluzzo, et al., "Pocket, Bag, Hand, etc- Automatically Detecting Phone Context through Discovery", Retrieved at <<http://www.cs.dartmouth.edu/~sensorlab/pubs/miluzzo-phonesense10.pdf>>, In Proceedings of PhoneSense, Nov. 2010, pp. 5.

Patel, et al., "Farther Than You May Think: An Empirical Investigation of the Proximity of Users to Their Mobile Phones", Retrieved at <<http://citeseerx.ist.psu.edu/viewdoc/download?doi=10.1.1.90.6249&rep=rep1&type=pdf>>, In Proceedings of the 8th International Conference on Ubiquitous Computing, Sep. 17, 2006, pp. 18.

Saponas, et al., "PocketTouch: Through-Fabric Capacitive Touch Input", Retrieved at http://research.microsoft.com/en-us/um/redmond/groups/cue/publications/saponaspockettouchuist2012.pdf>>, In Proceedings of the 24th Annual ACM Symposium on User Interface Software and Technology, Oct. 16, 2011, pp. 5.

Shafer, Ilari., "Learning Location from Vibration", Retrieved at <<http://www.mrcaps.com/proj/LocationVibration/files/vibration-ishafer-paper.pdf>>, Feb. 13, 2013, pp. 8.

Siewiorek, et al., "SenSay: A Context-Aware Mobile Phone", Retrieved at <<http://ieeexplore.ieee.org/stamp/stamp.jsp?tp=&arnumber=1241422, In Proceedings of Seventh IEEE International Symposium on Wearable Computers, Oct. 21, 2003, pp. 2.

Vahdatpour, et al., "On-Body Device Localization for Health and Medical Monitoring Applications", Retrieved at <<http://ieeexplore.ieee.org/stamp/stamp.jsp?tp=&arnumber=5767593>>, In IEEE International Conference on Pervasive Computing and Communications, Mar. 21, 2011, pp. 8.

Wimmer, et al., "HandSense: Discriminating Different Ways of Grasping and Holding a Tangible User Interface", Retrieved at <<http://citeseerx.ist.psu.edu/viewdoc/download?doi=10.1.1.164.6648&rep=rep1&type=pdf>>, In Proceedings of the 3rd International Conference on Tangible and Embedded Interaction, Feb. 16, 2009, pp. 4.

Shi, et al., "A Rotation Based Method for Detecting On-Body Positions of Mobile Devices", Retrieved at <<http://dl.acm.org/citation.cfm?id=2030212>>, In Proceedings of the 13th International Conference on Ubiquitous Computing, Sep. 17, 2011, pp. 559-560.

* cited by examiner

INFERRING PLACEMENT OF MOBILE ELECTRONIC DEVICES

BACKGROUND

Mobile electronic devices such as media players, mobile phones, tablet-based devices, etc., are rapidly becoming ubiquitous throughout most of the world. While a few studies have examined the proximity of people to their electronic devices, such as mobile phones, and where people have those devices while out and about, there is relatively little data about how people actually carry or position such devices. For example, while it is intuitive to assume that people carry, transport, or temporarily place their devices in pockets, bags, and purses, set them on tables or counters, hold them in their hands, etc., there is little in the way of specific facts with respect to where people keep their electronic devices at any particular point in time. Further, factors that may influence where a person puts her device at any particular time have not generally been well investigated.

Various recent studies have focused on specific interview questions, such as how often a person's phone is in their immediate proximity. Once such study found broad variation across participants with individual proximity levels for the phone being within arm's reach, ranging from 17% to 85%. Whether or not the person was home, sleeping, or if it was the weekend had the biggest impact on behavior. Another similar study determined that user's phones were within arm's reach 53% of the time and within the same room as the user 88% of the time. This study also highlighted that a user's context and routine affected phone proximity, for example more likely leaving the phone out when at home and more likely carrying it in a pocket or purse outside of the home.

Another recent study conducted a large-scale interview study asking large numbers of people where they keep their phones when they are out, why they chose this place, and if it was the usual place. The results of this study were strongly divided by gender, with 57% of men reporting that their phone was in their trouser pocket (8% for women), and 76% of women reporting that their phones were kept in a shoulder bag or backpack (10% for men). They also reported reasons that participants identified for placing the phone outside of the normal location, including variations in clothing (e.g., no pockets), expecting a phone call, or not wanting to be interrupted.

In addition to the types of studies noted above, various techniques have been suggested for using accelerometer and gyroscopic data for detecting whether a phone is being held in a user's hand or is in a user's pocket or purse in the case that a user is actively walking. This information is then used to implement various solutions for solution for preventing unintended phone operation. Unfortunately, such techniques are unable to classify any off-body locations (e.g., in a bag or on a desk).

Other existing approaches aim to be activity invariant by incorporating data from other sensors either in addition to or instead of accelerometers. For example, one such approach used a light sensor in a lab environment to determine when a phone was in a trouser pocket or out of the pocket. Another approach used features derived from listening on the microphone and a multi-round classification approach to infer whether the phone was in a user's pocket or not.

Another technique for evaluating device sensors uses a combination of gyroscope, accelerometer, compass, light, and proximity sensors to infer when the user picks up the phone to receive a call so that the ringtone volume could be muted when the phone is picked up. A somewhat related technique uses capacitive sensors on each side of a phone-shaped prototype to determine how a user is holding the device, with that information then being used to classify a set of different hand-grip configurations.

In contrast to the techniques noted above, various active approaches for providing or causing observable results have been suggested. For example, one such technique activates a vibration motor on the device and detects movement using an accelerometer. This active vibration information is evaluated in combination the emission of short 'beeps' while listening on the microphone and accelerometer to fingerprint an environmental response. A potentially less noticeable active approach uses a photo resistor and a light-to-frequency converter for sensing light from set of colored LEDs. Such approaches are used to determine various device placement scenarios.

SUMMARY

This Summary is provided to introduce various concepts in a simplified form that are further described below in the Detailed Description. This Summary is not intended to identify key or essential features of the claimed subject matter, nor is it intended to be used as an aid in determining the scope of the claimed subject matter. Further, while certain disadvantages of prior technologies may be noted or discussed herein, the claimed subject matter is not intended to be limited to implementations that may solve or address any or all of the disadvantages of those prior technologies.

In general, a "Placement Detector," as described herein, provides various techniques for allowing handheld or mobile electronic devices such as phones, media players, tablets, etc., to perform a sensor-based self-evaluation of their environment to infer where they are placed within that environment relative to a user. More specifically, the Placement Detector enables various handheld or mobile electronic devices to evaluate one or more sensors associated with the device relative to one or more trained sensor-based probabilistic models to infer or determine a current placement of the device.

Example placement determinations made by the Placement Detector include, but are not limited to, inferring whether the device is currently on or associated with a user's person, e.g., in a user's hand, in a user's pocket, in a user's purse (or other carrying bag or backpack). If the device is not on or associated with the user's person, other placement inferences include, but are not limited to, whether the device is in a closed area such as a drawer, box, or other relatively small space, in an open area such as on a table, indoors, outdoors, etc. These types of placement determinations facilitate a wide range of automated user-device interactions, including, but not limited to, placement-dependent notifications, placement-dependent responses to various inputs, prevention of inadvertent "pocket dialing," prevention of inadvertent power cycling of devices, lost or misplaced device location assistance, etc.

In various embodiments the Placement Detector is implemented within the electronic devices such as phones, media players, tablets, etc. Existing handheld or mobile electronic devices having sensor input and computational capability can be updated via software or firmware updates to implement the functionality of the Placement Detector. In related embodiments, the Placement Detector is implemented in a carrying case, cover, or holder type form factor. Similarly, in various embodiments, the Placement Detector is implemented as a hardware attachment to existing handheld or mobile electronic devices. In carrying case, holder, cover, and hardware attachment type form factors, the Placement Detector holds or encloses the handheld or mobile electronic device (or other object), or is otherwise coupled to the device, and is in wired or wireless communication with the that device (or any other computing device) for the purpose of facilitating or initiating automated user-device interactions such as those noted above.

Whether or not the Placement Detector is implemented within the mobile electronic device, or as a carrying case, cover, holder, or hardware attachment for the mobile electronic device, the operation and functionality of the Placement Detector is generally the same. In the case of the carrying case, cover, holder, or hardware attachment form factor, the Placement Detector evaluates input from any of its own sensors, and may also evaluate any input from sensors of the handheld or mobile electronic device, to infer its own placement. The Placement Detector then reports its placement inference to the handheld or mobile electronic device so that device can initiate various placement-based user-device interactions. Alternately, in such embodiments, the Placement Detector directly initiates various placement-based user-device interactions with respect to the handheld or mobile electronic device.

In view of the above summary, it is clear that the Placement Detector described herein provides various techniques for inferring placement of handheld electronic devices relative to a user in order to facilitate a wide range of automated user-device interactions. In addition to the just described benefits, other advantages of the Placement Detector will become apparent from the detailed description that follows hereinafter when taken in conjunction with the accompanying drawing figures.

BRIEF DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

Figure 1:
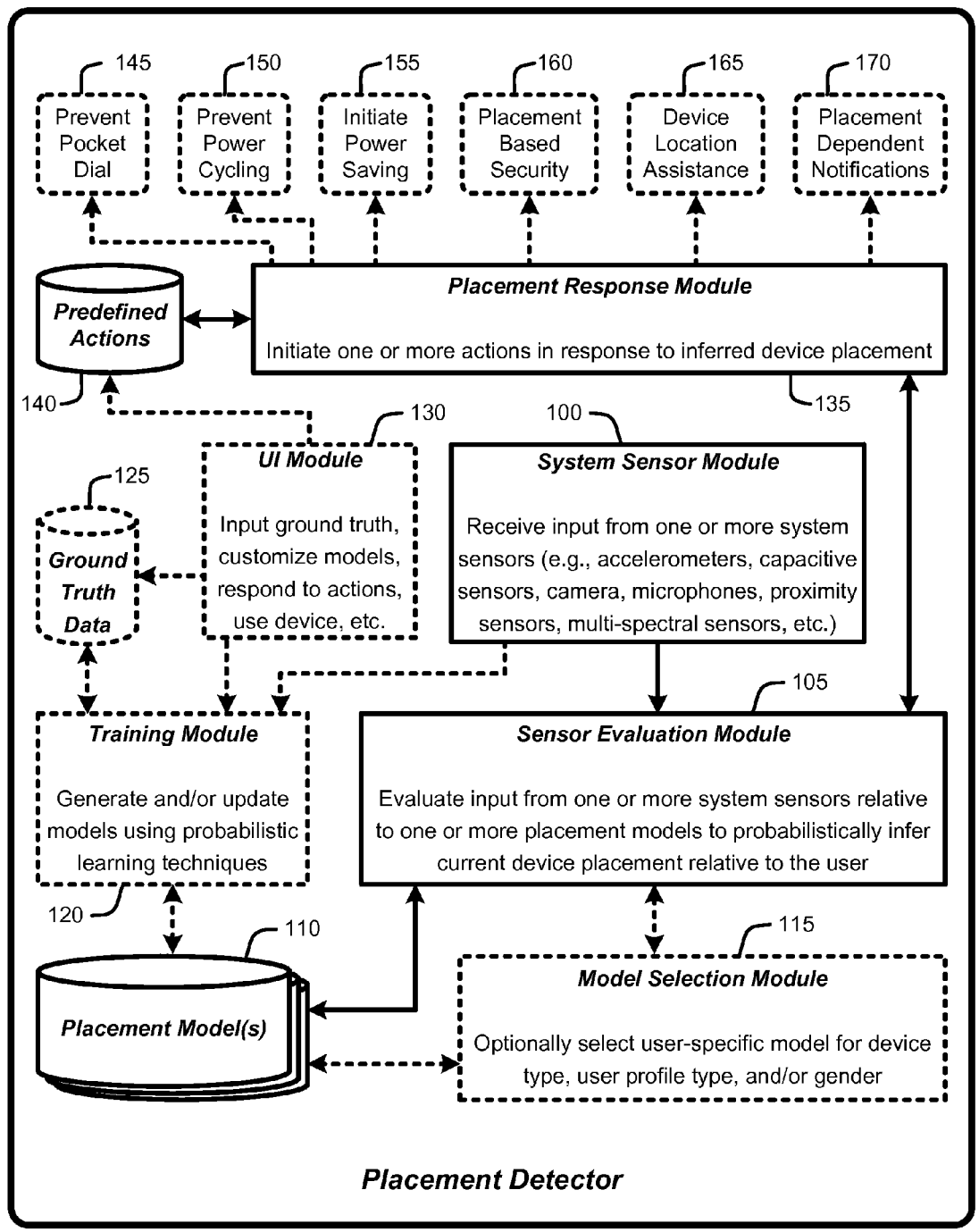
FIG. 1 provides an exemplary architectural flow diagram that illustrates program modules for implementing various embodiments of a "Placement Detector," as described herein.

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 INTRODUCTION

In general, a "Placement Detector," as described herein, provides various techniques for inferring placement of handheld electronic devices relative to a user in order to facilitate a wide range of automated user-device interactions. Example placement inferences relative to the user include, but are not limited to, inferring whether the device is currently in a user's hand, in a user's pocket, in a user's purse (or other carrying bag or backpack), in a closed area such as a drawer or box, in an open area such as on a table, indoors, outdoors, etc.

Note that the following discussion generally focuses on smartphones for purposes of explanation. However, the concepts described herein with respect to the Placement Detector are applicable for use with a broad range of devices, including, but not limited to, media players, cameras, remote controls, tablets, mobile medical devices and related technology, etc. Consequently, it should be understood that while sensor placement and types may vary for some of these devices, and not all placements will be equally likely across the devices (e.g., many tablets do not fit in trouser pockets), the basic capabilities of Placement Detector described herein are applicable beyond the specific form factor of the smartphones discussed herein.

The Placement Detector provides the aforementioned placement inference capabilities by evaluating sensor readings from electronic devices in combination with one or more trained probabilistic models relating to user device placements. These placement models are generally constructed using various machine learning techniques that construct models to correlate device sensor readings relative to user device placement ground truth information for large groups of users and devices. Once trained, the probabilistic models are then used in combination with real-time or current sensor readings to infer current device placement for arbitrary users. Inferring device placement relative to the user then enables a wide range of automated placement-based user-device interactions.

For example, given an electronic device having one or more accelerometers, data collected from those accelerometers was evaluated to extract various features and statistics for each accelerometer axis over windows of the accelerometer data. Example features and statistics include, but are not limited to mean, variance, root mean square (RMS), interquartile ranges, wavelets, sums of detail coefficients across sequences of wavelets, etc. This information is then provided as input to various machine learning techniques with corresponding ground truth information to train one or more placement models.

Clearly, many conventional electronic devices include a wide range of sensors. As such, the Placement Detector takes advantage of any number of sensor types and readings for use in constructing placement models for various electronic devices. Examples of other sensors used by the Placement Detector include, but are not limited to:

a. Proximity Sensor and Light Sensor: These sensors exist on many of today's mobile devices.
b. Two-Dimensional Capacitive Arrays: Most new electronic devices such as smartphones and media players, for example, use capacitive technology in their touchscreens. The most apparent capability of this sensor is detecting when a hand grasps a phone. However, the Placement Detector also provides various techniques for determining when such as device is in a user's trouser or shirt pocket by detecting the user's body through the material of the pocket.

c. Multi-Spectral Sensor: A sensing device capable of either or both emitting and detecting multiple optical frequencies is used by various embodiments of the Placement Detector to infer device placement. In a tested embodiment, the Placement Detector used a multi-spectral sensor having red, green, blue, ultraviolet, and infrared LEDs, a photo resistor, and a light-to-frequency converter. This device emitted light from the LED's then captured the reflected light in return. This information was then used, as with the other sensors, for training one or more placement models.

d. Other Sensors: Other sensors used by the Placement Detector include, but are not limited to, microphones, cameras, gyroscopic devices, etc.

As with the accelerometer example summarized above, various statistical features were extracted from all of these sensors and used for the model training process. Note that in the case that any particular device includes multiple sensors, (e.g., accelerometers, capacitive arrays, and light sensors), the model training process can be used to construct separate models for each sensor, and can also be used to construct combined models that consider the input of multiple sensor types.

In a tested embodiment, the placement models constructed using various sensors include, but are not limited to:

a. Enclosed or Out: whether the electronic device is out and potentially visible to a user, or if it is put away. Applications for this model include, but are not limited to, preventing pocket dial, and knowing whether or not visual notification mechanisms (e.g., flashing light or screen) will be noticed.

b. On Person or Not: These models are useful to determine whether or not the electronic device is on the person of the user. Applications for this model include, but are not limited to, dynamic notification preferences (e.g. whether or not to ring or vibrate) and progressive authentication (e.g., whether the user has to re-authenticate, based on whether she could have been separated from the phone since last authenticated).

c. In Bag, In Pocket, Out, or In Hand: These models are used to locate the electronic device at a finer granularity. This is useful for "find my phone" type functionality (e.g., "your phone has been in a bag since 11:22 am"). Note that in this case, the user obtains a location report by polling or contacting a remote service to which the electronic device has reported its inferred location. Other uses for these models include, but are not limited to, sharing the user/phone's context to provide social awareness, increasing or decreasing ringer volume for incoming calls, switching from vibrate to ring if the electronic device is in a bag or purse, etc.

Following model training, feature extraction of real-time or current data collected from one or more of the various sensors associated with the electronic device is then used in combination with the trained models to infer current placement for arbitrary electronic devices. More specifically, this extracted information is evaluated relative to one or more of the placement models using various machine learning techniques to infer current device placement relative to the user.

1.1 System Overview:

As noted above, the "Placement Detector," provides various techniques for inferring placement of handheld electronic devices relative to a user in order to facilitate a wide range of automated user-device interactions. The processes summarized above are illustrated by the general system diagram of FIG. 1. In particular, the system diagram of FIG. 1 illustrates the interrelationships between program modules for implementing various embodiments of the Placement Detector, as described herein. Furthermore, while the system diagram of FIG. 1 illustrates a high-level view of various embodiments of the Placement Detector, FIG. 1 is not intended to provide an exhaustive or complete illustration of every possible embodiment of the Placement Detector as described throughout this document.

In addition, it should be noted that any boxes and interconnections between boxes that may be represented by broken or dashed lines in FIG. 1 represent alternate embodiments of the Placement Detector described herein, and that any or all of these alternate embodiments, as described below, may be used in combination with other alternate embodiments that are described throughout this document.

In general, as illustrated by FIG. 1, the processes enabled by the Placement Detector begin operation by using a system sensor module 100 to receive input from one or more system sensors. Examples of sensors used by the Placement Detector include, but are not limited to, accelerometers, cameras, capacitive sensors, proximity sensors, microphones, multi-spectral sensors, etc. The received sensor input is then passed to a sensor evaluation module 105 where it is evaluated relative to one or more placement models 110 to probabilistically infer current device placement relative to a particular user.

In general, the placement models 110 are constructed using any desired machine learning techniques, including, but not limited to, techniques such as random forest based classifiers, support vector machines, artificial neural networks, etc. A training module 120 is used to generate or learn each placement model 110 based on various combinations of sensor inputs and corresponding ground truth data 125. In various embodiments, a UI module 130 was used to provide ground truth data to the training module for use in learning one or more of the placement models 110. In various embodiments, this ground truth data was obtained from various groups or sets of users by implementing a data collection application that periodically asked each user to select where their electronic device was from a set of predefined placements at a particular point in time (generally within the last 30 minutes or so, though this time period can be set to any desired length). The user selected placement was then correlated to various sensor readings recorded or captured at or near the time corresponding to the user selected placement information to create ground truth data sets.

The user selected placement information and corresponding sensor readings were then provided for use by the training module 120 in learning or generating one or more placement models 110. Note also that in various embodiments, user interactions with particular electronic devices are used by the training module 120 to update one or more of the placement models 110 over time to customize one or more of those placement models for individual users. Further, by evaluating common characteristics to identify discrete sets of users, placement models 110 can be tailored to specific user profile types (e.g., users that typically place their device in the same location, users that typically place their devices in a relatively small number of consistent locations, users that tend to place their device in arbitrary locations, etc.).

Generating such models, and then assigning particular users to corresponding models allows the Placement Detector to correctly identify device locations or placement with increased accuracy for particular users. Further, in constructing various placement models 110, it was observed that gender-based differences existed in user device placements. For example, male users tend to carry electronic devices in trouser pockets, while female users tend to carry electronic devices in purses or other carrying bags. Consequently, assigning particular users to gender-specific models also allows the Placement Detector to correctly identify device locations or placement with increased accuracy for particular users. Further, different models may be constructed for different device types. For example, users may tend to place television remote controls in different locations than their smartphones.

Regardless of how the placement models 110 are constructed and selected, updated, or assigned to particular users, they are provided for use in current placement determinations for new or arbitrary users. Note that a model selection module 115 is used in various embodiments to select one or more of the placement models 110 for use by the sensor evaluation module. As noted above, selection of specific placement models 110 is intended to provide a model that provides results for specific users that are more consistent with respect to particular device types (e.g., different models for smartphones and remote control devices), and/or particular user profiles types selected from a set or list of more or more pre-defined profile types, and/or user gender.

Once the sensor evaluation module 105 has inferred current device placement, the placement information is passed to a placement response module 135. The placement response module 135 then automatically initiates one or more actions from a set of predefined actions 140 in response to the inferred device placement. For example, if a user's phone is determined by the sensor evaluation module 105 to be located in the user's trouser pocket the placement response module 135 can automatically prevent the phone from dialing or sending text messages. Examples of placement-based predefined actions initiated by the placement response module 135 include, but are not limited to, preventing pocket dial 145, preventing power cycling 150, initiating a device power saving mode 155, placement-based security 160, device location assistance 165, placement dependent notifications 170, etc.

Note that the UI module 130 is used in various embodiments of the Placement Detector to manually define, automatically create, delete, or adjust, one or more of the predefined actions 140 to be automatically initiated by the placement response module 135. For example, if a user typically first checks email after picking up her phone, the placement response module 135 can use various machine learning techniques to learn this behavior and automatically initiate an action for starting an email app (or asking the user if the app should be started) as soon as the sensor evaluation module 105 infers that the user has picked up the phone. Similarly, complex sequences of actions for any device can also be learned and automatically initiated by the placement response module 135 in response to one or more user device placement determinations.

2.0 OPERATIONAL DETAILS OF THE PLACEMENT DETECTOR the above-described program modules are employed for implementing various embodiments of the Placement Detector. As summarized above, the Placement Detector provides various techniques for inferring placement of handheld electronic devices relative to a user in order to facilitate a wide range of automated user-device interactions. The following sections provide a detailed discussion of the operation of various embodiments of the Placement Detector, and of exemplary methods for implementing the program modules described in Section 1 with respect to FIG. 1. In particular, the following sections provides examples and operational details of various embodiments of the Placement Detector, including:

Operational overview of the Placement Detector;
Placement model construction;
General data collection;
Guided data collection;
General placement classifications;
Inferring placement using various sensors;
Automated placement-based actions; and
Hardware attachment type form factors.

2.1 Operational Overview:

As noted above, the Placement Detector-based processes described herein provide various techniques for infer the current position or placement of handheld or mobile electronic devices. Placement inference is performed by evaluating one or more sensors associated with the device relative to one or more trained probabilistic models to infer device placement relative to a user. Example placement inferences relative to the user include, but are not limited to, inferring whether the device is currently in a user's hand, in a user's pocket, in a user's purse (or other carrying bag or backpack), in a closed area such as a drawer or box, in an open area such as on a table, indoors, outdoors, etc. These types of placement inferences facilitate a wide range of automated user-device interactions by the Placement Detector, including, but not limited to, placement-dependent notifications, placement-dependent responses to various inputs, prevention of inadvertent "pocket dialing," prevention of inadvertent power cycling of devices, lost or misplaced device location assistance, etc.

2.2 Placement Model Construction:

In general, various machine learning techniques are used to construct one or more placement models for use in evaluating real-time or recent sensor data. In various embodiments, the machine learning techniques for generating these placement models were enhanced by providing ground truth data temporally correlated with readings from one or more device sensors. Note that the following discussion generally refers to creating placement models for cell phones. However, the same or similar techniques are be used to create placement models for any desired electronic device. Further, models for one electronic device (e.g., a smartphone) may be applicable for other devices (e.g., a portable media player).

For example, in a tested embodiment, sensor data was collected in-situ and used to train and evaluate several phone placement models by using an experience-sampling method (ESM) to collect accelerometer data from the personal smartphones of a group of users in conjunction with ground-truth labels describing the phone's placement. Ground truth information was obtained by periodically polling the user to provide an input as to the current location of their phone.

Data for use by the various machine learning techniques for generating the placement models fell into one of two categories. One such category was a general data collection category, as discussed in Section 2.3, where users were asked to periodically report the position of their phone at a particular time following some period of automated sensor data collection for that time. Another such category, as discussed in Section 2.4, included a guided data collection scenario where users were directed to perform particular placement scenarios or actions in combination with automated sensor data collection. Note that any desired data collection scenario can be performed to obtain data for use by various machine learning techniques in generating one or more of the placement models. As such, it should be understood that the exemplary data collection scenarios (and the various sensors used) that are discussed below are provided only for purposes of explanation and are not intended to limit the scope of data collection techniques or sensor types that may be adapted for use by the Placement Detector for use in generating the placement models.

2.3 General Data Collection:

Clearly, a wide range of techniques can be used to periodically or occasionally collect sensor data and correlate that data to user self-reports of where their phone was at the time the sensor data was collected. Further, it should also be understood that once the placement models have been created, those models can then be distributed to the electronic devices of new users for use by the Placement Detector without requiring those new users to provide any ground truth data or any other input for creating or updating those placement models.

For example, in a tested embodiment, a data collection application was used to collect 10 seconds of multi-axis accelerometer data roughly every 30 minutes. The data collection application then prompted the user to respond to a survey asking "Where was your phone at XX:XX pm?" To support relative consistency in user responses, this survey asked the user to select from a variety of predefined placement choices in response to this ground truth placement question. Examples of such choices include, but are not limited to, the categories and sub-categories provided below in Table 1:

TABLE 1

Exemplary Predefined Placement Categories

| Category | Sub-Categories | Sub-Categories for "Other" Responses |
|---|---|---|
| Bag | Backpack | None |
|  | Purse |  |
|  | Shoulder Bag |  |
|  | Other |  |
| Pocket | Trousers, Front | Apron |
|  | Trousers, Back | Armband |
|  | Shirt | Holster |
|  | Jacket |  |
|  | Other |  |
| Car | Cradle | Center Console |
|  | Cup Holder | Pocket on Car Door |
|  | Dashboard |  |
|  | Lap, |  |
|  | Passenger Seat |  |
|  | Other |  |
| Out | Tabletop | Couch/Chair |
|  | Nightstand | Couch/Chair Arm |
|  | In Hand | Cradle/Charge Station |
|  | Desktop | Floor |
|  | Counter | Lap |
|  | Other | Shelf |
| Enclosed | Drawer | None |
|  | Other |  |
| Don't Know |  |  |
| User-Entered Category |  |  |

While not necessary, unanswered surveys expired when the next set of accelerometer data was collected and unlabeled accelerometer data was deleted. Completed survey responses and corresponding accelerometer data were then provided for use in training one or more placement models using various machine learning techniques. Further, to account for differing numbers of survey responses per participant, a calculation was made as to how many different participants reported putting their phone in a particular place relative to the total number of responses for a category to determine which categories were common across participants.

The resulting ground-truth labels were observed to be useful for showing the breadth of places participants placed their phones. In addition, when GPS data was available, it was correlated with the accelerometer data and user survey responses to categorize responses that happened at a participant's Home, Work, Other or Unknown location. This information was then used to further refine the resulting placement models.

Further, the collected data showed three different user profile types, with one such profile type tending to place their phones in consistent locations, a second such profile type tending to place their phones in a small but consistent number of places, and a third profile type tending to place their phone in relatively arbitrary places. As such, different placement models were generated for each of these three user profile types. Clearly, the profile types described are provided only for purposes of explanation, and more or fewer user profile types can be defined to represent any desired user placement behavioral characteristics without departing from the intended scope of the Placement Detector described herein.

2.4 Guided Data Collection:

In order to collect additional useful data for refining the machine learning of the various placement models, additional sensor data was collected from various sets or groups of users during predefined behaviors with predefined phone placements.

For example, users were asked to use anything that they might normally put their phone into including jackets, purses, or other bags. Data was then collected from each user in a subset of the most commonly observed places that those users reported having kept their phone, including, but not limited to, front trousers pocket, back trousers pocket, jacket pocket, bag/purse, and hand.

For each place users normally keep their phone, they completed a series of predefined activities over known periods of time to simulate some of the various conditions that the phone might encounter in everyday life while in a particular placement. For example, for placements except bag/purse, these activities included, but were not limited to, sitting on a couch, sitting on a desk chair, standing in place, and walking around. For the bag/purse scenario, users were instructed to perform activities such as letting the bag sit on the floor, standing while holding the bag, walking while carrying the bag, etc. Further, where the phone had directional sensors (e.g., accelerometers or capacitive sensors on a particular surface) sensor data was collected for each placement with each phone facing both inwards and outwards (or up or down).

2.4.1 Data Collection for Surfaces:

Unlike the other placements, most of the variation in placing a device on a surface involves finding a variety of surfaces. Thus the surface-specific data was manually collected following a similar process to the other placements. In particular, data was recorded from each device in the two orientations of facing-up and facing-down. Data was collected for a wide range of surfaces, including, but not limited to, tables, desks, chairs, couches, on and in a metal filing cabinet, on a pillow, etc.

2.4.2 Assembling Sensor Data:

For each placement (e.g., pocket or desk), data was collected from multiple sensors of the phone in two orientations each (e.g., facing-in and facing-out, or facing-up and facing-down, depending on the particular placement). The resulting multiple sensor recordings for each placement were then used in combination for training the placement models. For example, in a tested embodiment of an electronic device having capacitive sensors, multi-spectral light sensors, proximity sensors, and accelerometers, the collected data (in both orientations, e.g., in and out, or up and down) included capacitive data, multispectral, proximity sensor data, and phone accelerometer readings.

2.4.3 Exemplary Feature Extraction:

Clearly, a wide variety of features can be extracted from various sensor readings. Example features and statistics include, but are not limited to mean, variance, root mean square (RMS), interquartile ranges, wavelets, sums of detail coefficients across sequences of wavelets, etc., with the particular features being collected generally corresponding to the particular type of sensor being considered. For example, in a tested embodiment, features were extracted from the accelerometers facing one direction (since accelerometer data in opposite directions would be redundant) and each of the other sensors facing two directions. This allowed the machine learning techniques to construct placement models that considered electronic devices in multiple orientations as well as simulating electronic devices having sensors on two sides.

For example, in the case of multi-spectral sensors, the extracted features included one reading from each of the light-to-frequency converter and photo resistor for each of no-light, red, blue, green, UV, and IR. For the light and proximity-sensor on the phone, a reading over a known window of time of the mean of an ambient-light level and a binary proximity state. In addition, with respect to the capacitive sensors, a reading over a known window of time at each "pixel" or point in the capacitive sensing grid was used to compute various features over the grid, including a mean over pixels, median pixel value, and number of non-zero pixels (e.g., pixels with some capacitance sensed). Finally, accelerometer readings over a known window were used to extract features and statistics such as mean, variance, RMS, etc.

2.5 General Placement Classifications:

In general, separate placement models can be constructed for each individual placement location for which data was collected. However, in a tested embodiment, general placement classifications or categories were defined to encompass sets of one or more of the individual placement categories or subcategories for which data was collected (e.g., see Table 1, above). Various machine learning techniques were then used to process the collected data to construct the placement models and evaluate live data for new users relative to those placement models for use in inferring the current location of electronic devices associated with those new users in terms of the general placement categories. In particular, in this tested embodiment, the general placement categories included whether the electronic device was Enclosed or Out; On Person or Not; and In Bag, In Pocket, Out or In Hand. These categories are discussed in further detail below.

2.5.1 Enclosed or Out:

This general placement category defines whether the smartphone or other electronic device is out and potentially visible to a user, or if it is put away. Applications for this model include, but are not limited to, preventing pocket dial, and knowing whether or not visual notification mechanisms (e.g., a flashing light or screen) will be noticed by the user.

2.5.2 On Person or Not:

This general placement category defines whether or not the smartphone or other electronic device is on the person of the user. Applications for this model include, but are not limited to, dynamic notification preferences (e.g., whether or not to vibrate or ring) and progressive authentication (e.g., whether the user has to re-authenticate, based on whether she could have been separated from the phone since last authenticated).

2.5.3 In Bag, In Pocket, Out, or In Hand:

This general placement category defines where the smartphone or other electronic device is at a finer granularity. This is useful for various functionality such as, for example, a "find my phone" type application, where the smartphone or other electronic device reports its inferred position to either a server or a second electronic device that contacts it with a placement location request. An automated response to that placement request is then provided to the second electronic device in response to a user query (e.g., "your phone has been in a bag since 11:22 am"). Other applications for this general placement category include, but are not limited to, sharing the user/phone's context to provide social awareness.

One consideration with respect to placing the user's smartphone or other electronic device in bags and purses is that placement models tend not to perform as well as for various other placement locations. Consequently, in various embodiments, placement inferences in bags and purses was enhanced by using an RFID reader associated with or coupled to the smartphone or other electronic device to determine whether it is in range of an RFID tag placed in or coupled to the bag or purse.

2.6 Inferring Placement Using Various Sensors:

To assess what sensing modalities would be most useful to augment an accelerometer-only approach to inferring phone placement, a study was conducted to evaluate the performance of other sensor types, either alone or in combination with one or more other sensors. It was observed that the use of multiple sensors allowed for the generation of placement models that were capable of disambiguating various placement location inferences. Examples of some of the various sensors used for this purpose are discussed below.

2.6.1 Proximity Sensor and Light Sensor:

These sensors already exist on many of today's mobile devices. As such, it is a simple matter to record the data produced by these sensors for use in both generating placement models and evaluating live data relative to those placement models.

2.6.2 Capacitive Sensors:

A large percentage of mobile devices use capacitive technology in their touchscreens, and some use capacitive sensing on other surfaces. The Placement Detector evaluates a raw capacitance signal from the capacitive sensor grid to determine the capacitance signal at each point or pixel of that grid. Typically, capacitive sensors are used to detect when a hand grasps a device having capacitive sensor capabilities, and to process user gestures across the device surface or screen.

However, the Placement Detector makes further use of capacitive sensors to detect capacitive signals generated in response to near-contact with the user's body through the user's clothing. For example, when such a device is in the user's trouser pocket, the capacitive sensor will generate signals in response to the near contact with the user's leg, separated from the device by the material lining the user's pocket. It was observed that using capacitive sensors in this way enabled the Placement Detector to determine with high accuracy whether the electronic device was on the person of the user or not.

Capacitive signals received from the capacitive sensors were used to construct one or more placement models, as discussed herein. Once those models were created, the Placement Detector then used real-time or current readings from the capacitive sensors to provide corresponding placement inference, either alone or in combination with other placement models or sensors.

2.6.3 Multi-Spectral Sensor:

In various embodiments, the Placement Detector, including the carrying case, cover, holder, or hardware attachment form factor discussed in Section 2.8, a multi-spectral sensor was used to provide input. In such embodiments, the multispectral sensor provides a sensing device comprised of red, green, blue, ultraviolet, and infrared LEDs, a photo resistor, and a light-to-frequency converter. The multi-spectral sensor device included a control processor used, in part, for logging readings from the sensors to local memory.

Light was emitted from one or more of the LED's and the returned reflected light captured by the sensors was used to provide sensor input that was used to construct one or more placement models, as discussed herein. Once those models were created, the Placement Detector then used real-time or current readings from the multi-spectral sensor to provide corresponding placement inference, either alone or in combination with other placement models or sensors.

2.6.4 Using Screen Illumination to Provide Sensor Input:

In various embodiments, the Placement Detector made use of light emitted from a display screen of the device in combination with a camera of the device to infer whether it was in a closed or open space. In general in such embodiments, different areas of the display screen were sequentially illuminated (thus projecting light away from the device) while the camera was used to capture an image for each different illumination. The resulting sequence of images was then evaluated to look for changes in reflected light resulting from the different illuminations.

This embodiment was observed to be particularly useful in dark areas. For example, in one embodiment, the Placement Detector was implemented within a handheld or mobile electronic device having a display screen and a camera (e.g., a typical smartphone). When that device was placed in a desk drawer, facing up, the light emitted by the screen was reflected against the upper surface of the drawer. An analysis of the amount of light returned from the images captured during different illuminations of the display screen enabled the Placement Detector to compute an approximate distance of the top of the drawer (or to any other surface or object) from the front of the mobile electronic device. Note that various triangulation-based techniques can be used for this purpose, assuming that the surface opposite the illuminated screen is relatively flat. Further, if more light is returned when one side of the screen is lit as compared to the other side of the screen being lit, it can be shown mathematically that the mobile electronic device is likely at an angle with respect to the reflecting surface (or that there is another object near that side of the phone).

In particular, in a tested embodiment, multiple images were captured by the camera and evaluated. One of these images was captured with the screen illumination turned off to provide a baseline. A second image was captured with the screen completely white to provide a maximum illuminance (using only the light from the screen). A series of pictures with different sections of the screen lit up (e.g., 10 horizontal sections, one at a time, and 10 vertical sections, one at a time) were then captured. Given the resulting set of baseline, max illuminance, and separate images lit by different horizontal and different vertical sections of the display screen, various image processing algorithms were then used to compare this set of images to make further inferences about the environment that the Placement Detector was in.

2.7 Automated Placement Based Actions:

As noted above, the capability to automatically infer current placement of handheld or mobile electronic devices relative to the user enables a wide range of placement-based actions and interactions. Several examples of such automated actions and interactions are described below. However, it should be clear that in view of the discussion provided herein, the following examples are not intended to limit the scope of the placement-based actions and interactions initiated by the Placement Detector. In other words, given an inference of the placement of a handheld or mobile electronic device relative to the user, any desired placement-based action or interaction can be initiated by the Placement Detector.

2.7.1 Placement-Based Notification Preferences:

Accessibility, primarily for receiving notifications, was the most common phone placement decision factor reported by many users. Using the Placement Detector to infer the current placement of handheld or mobile electronic devices enabled users to set placement-specific notification preferences (e.g., vibrate if in my front pocket; turn on the screen if sitting out on a table first and then ring, etc.). Further, considering such user-specified preferences was used in various embodiments as input to the machine learning techniques for updating the placement models to enable the Placement Detector to infer whether different phone placements coincide with a desire to change notifications preferences. For example, using vibration is a useful ringing preference when in a trouser pocket, but can be quite jarring if it vibrates while sitting on a hard surface.

2.7.2 Preventing Pocket Dial:

Despite the fact that proximity sensors have become nearly universal on smartphones, accidental interaction with a phone's touchscreen remains a nuisance. Using the Placement Detector to infer the current placement of handheld or mobile electronic devices enabled the phone (or other electronic device) to infer that input may be accidental. For example, when a phone detects that it is "enclosed" (e.g., in a pocket, purse, etc.) the Placement Detector can initiate actions such as, for example, automatically locking the screen, or requiring some user intelligent input before initializing a phone call.

2.7.3 Dynamic Authentication Requirements:

Authentication on smartphones or other handheld or mobile electronic devices can be annoying to the user, both because of the small interaction space and because of the frequency with which people interact with their handheld or mobile electronic devices. However, using the Placement Detector to infer the current placement of handheld or mobile electronic devices enabled various security type applications. For example, where the Placement Detector inferred that the user's phone had been "on person" since the last time the user authenticated, the Placement Detector can automatically eliminate or cancel any required user re-authentication or can initiate a less rigorous form of authentication.

2.7.4 Placement Determination Used as Contextual Information:

In general, using the Placement Detector to infer the current placement of handheld or mobile electronic devices enabled exposes a new piece of contextual information for handheld or mobile electronic devices. In some cases, the resulting placement context of the handheld or mobile electronic device could be useful to share with others (e.g., predicting whether or not somebody will respond to a phone call depending on whether the phone is inferred to be in a user's pocket or in a drawer) or as an additional piece of information for a "Find My Phone" type service. As noted above, responses to a user query in this regard could include the most current placement inference available or a temporal history of placement inferences, e.g., "your phone is currently at home in your backpack."

2.8 Hardware Attachment Type Form Factors:

As noted above, the Placement Detector can be implemented directly within an electronic device such as a smartphone, media player, etc. However, in some cases, the electronic device may not have sufficient computational capability, memory, storage, sensors, etc., to enable direct implementation of the Placement Detector within that device. Consequently, in various embodiments, the Placement Detector is implemented in a stand-alone hardware attachment type form factor, complete with one or more sensors.

Such standalone form factors of the Placement Detector can be used as a carrying case, cover, holder, etc., for various electronic devices, or even as a wallet or the like to carry cash, cards, papers, etc. In this case, the standalone version of the Placement Detector is coupled to the electronic device (or used to hold or carry other objects), with the standalone version of the Placement Detector then providing the placement inference and placement-based action initiation processes described above. In addition, the standalone version of the Placement Detector can be in wired or wireless communication (e.g., USB, Bluetooth, etc.) with the electronic device (or any other local or remote computing device) in order to cause any such device to perform one or more of the automatically initiated actions in response to the inferred device placement.

Figure 2:
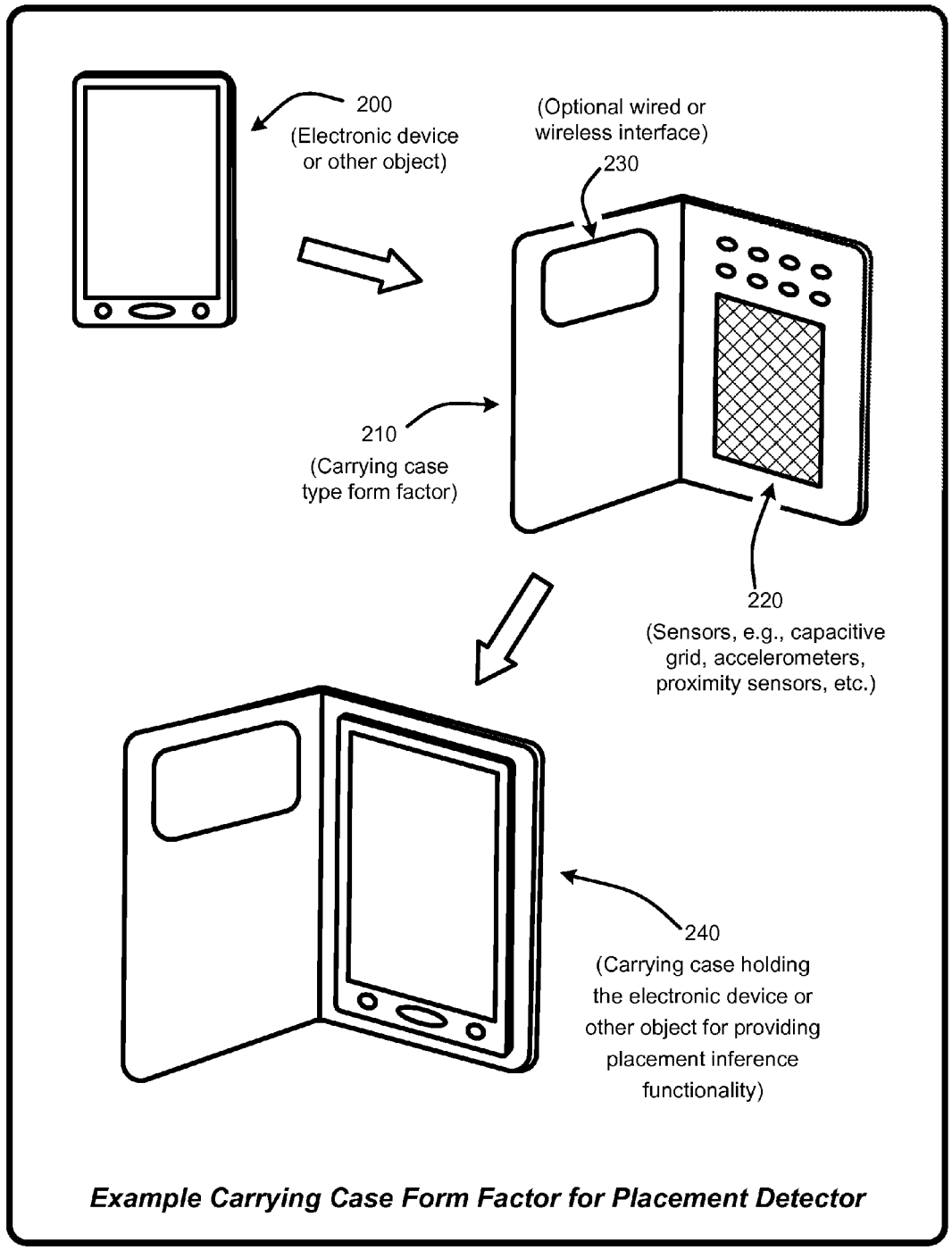
FIG. 2 provides an example of implementing the Placement Detector within a carrying case type form factor providing placement inference functionality for electronic devices or other objects held by or coupled to the carrying case, as described herein.

FIG. 2 provides a simple example of a carrying case type form factor for implementing the Placement Detector. The carrying case type form factor of the Placement Detector may be implemented in a wide variety of forms, and is not intended to be limited to the illustration or use shown in FIG. 2. In this form factor, the carrying case provides some or all of the placement inference functionality for whatever electronic devices or other objects are held by or coupled to the carrying case. In this example, an electronic device or other object 200 is placed into a carrying case 210 type form factor of the Placement Detector.

As illustrated, the carrying case 210 type form factor of the Placement Detector includes one or more sensors 220, such as, for example, a capacitive grid, proximity sensors, accelerometers, etc. In addition, the carrying case 210 type form factor of the Placement Detector may also include an optional wired or wireless interface 230 for communicating with the electronic device or other object 200 placed into a carrying case 210, or with other any other computing devices. Element 240 of FIG. 2 shows the electronic device or other object 200 being coupled or otherwise attached to the carrying case 210 type form factor of the Placement Detector. Note that the carrying case 210 is closable or foldable, but is shown in a partially open state for purposes of illustration.

3.0 OPERATIONAL SUMMARY OF THE PLACEMENT DETECTOR

Figure 3:
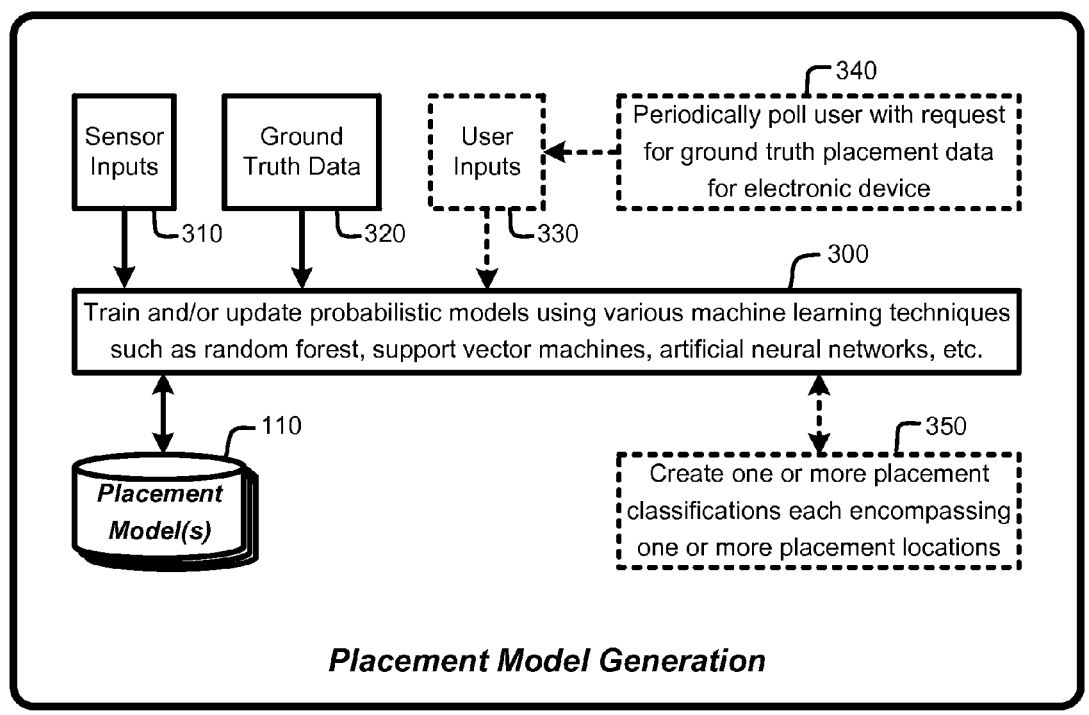
FIG. 3 provides a general system flow diagram that illustrates exemplary methods for using machine learning techniques for learning placement models for use by various embodiments of the Placement Detector, as described herein.
Figure 4:
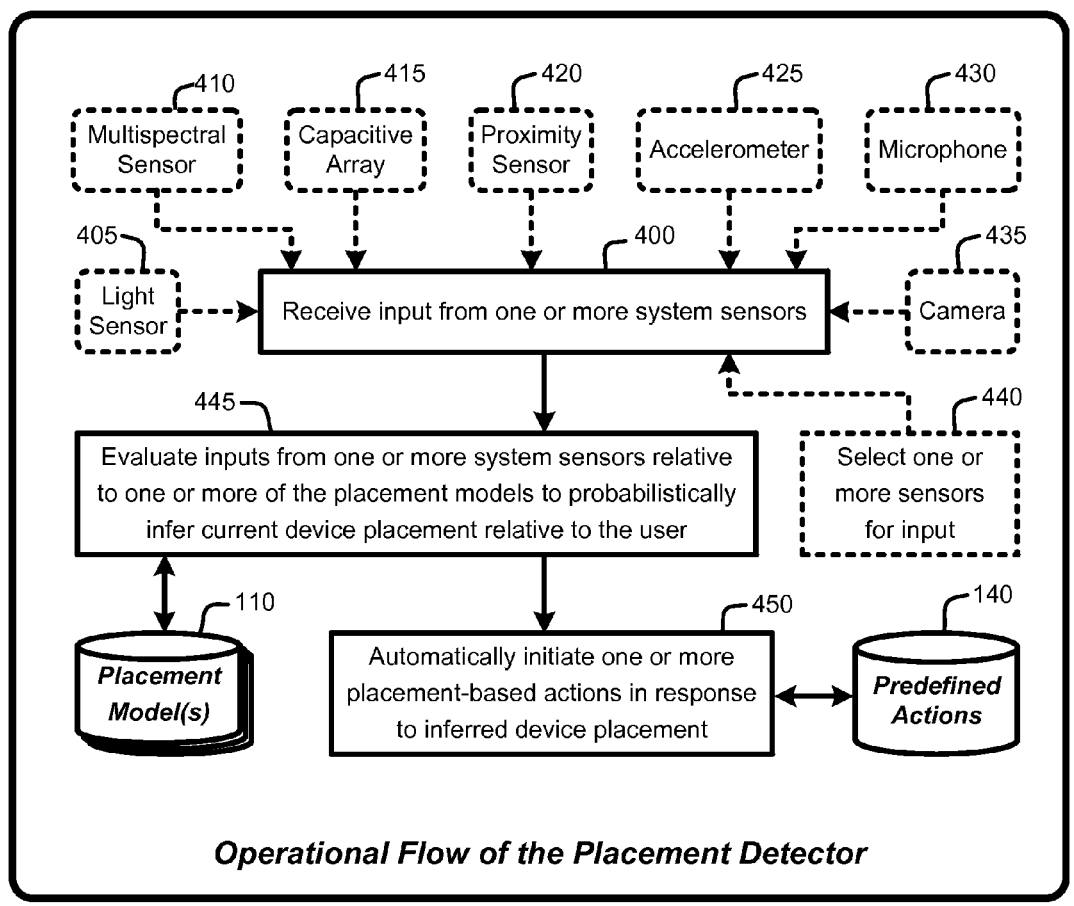
FIG. 4 provides a general system flow diagram that illustrates exemplary methods for implementing various embodiments of the Placement Detector, as described herein.

The processes described above with respect to FIG. 1 through FIG. 2, and in further view of the detailed description provided above in Sections 1 and 2, are illustrated by the general operational flow diagrams of FIG. 3 and FIG. 4. In particular, FIG. 3 provides a general system flow diagram that illustrates exemplary methods for using machine learning techniques for learning placement models for use by various embodiments of the Placement Detector, as described herein. FIG. 4 provides a general system flow diagram that illustrates exemplary methods for implementing various embodiments of the Placement Detector given one or more trained placement models, as described herein. Note that neither FIG. 3 nor FIG. 4 are intended to provide an exhaustive representation of all of the various embodiments of the Placement Detector described herein, and that the embodiments represented in FIG. 3 and FIG. 4 are provided only for purposes of explanation.

Further, it should be noted that any boxes and interconnections between boxes that are represented by broken or dashed lines in FIG. 3 or FIG. 4 represent optional or alternate embodiments of the Placement Detector described herein, and that any or all of these optional or alternate embodiments, as described below, may be used in combination with other alternate embodiments that are described throughout this document.

In general, as illustrated by FIG. 3, training of probabilistic or statistical placement models 110 for use by the Placement Detector begins by training 300 and/or updating the probabilistic models using various machine learning techniques such as random forest based classifiers, support vector machines, artificial neural networks, etc. Any desired probabilistic, statistical or machine learning technique can be used for this purpose given sensor inputs 310 and corresponding ground truth data 320.

As discussed above, rather than creating separate placement models 110 for each possible placement location, in various embodiments, the Placement Detector creates 350 one or more placement classifications, each encompassing one or more placement locations. In addition, as discussed above, various user inputs 330 can be used during the training process to refine the resulting placement models 110. For example, in a tested embodiment, a data collection process for use in training the placement models 110 was used where the Placement Detector used an application to periodically poll 340 the user with a request for ground truth placement data for whatever electronic device was being used in combination with the Placement Detector.

In general, as illustrated by FIG. 4, once the placement models 110 are available, the Placement Detector begins operation for arbitrary electronic devices and users by receiving 400 input from one or more system sensors. As discussed above, example sensors include, but are not limited to, light sensors 405, multispectral sensors 410, capacitive arrays 415, proximity sensors 420, accelerometers 425, microphones 430, cameras 435, etc. In various embodiments, either the Placement Detector or the user selects 440 one or more particular sensors for input. Otherwise, the Placement Detector can simply use all available sensor information. The Placement Detector then evaluates 445 inputs from one or more of the system sensors relative to one or more of the placement models 110 to probabilistically infer current device placement relative to the user. Finally, once placement has been inferred, the Placement Detector automatically initiates 450 one or more placement-based pre-defined actions 140 in response to the inferred device placement.

4.0 EXEMPLARY OPERATING ENVIRONMENTS

Figure 5:
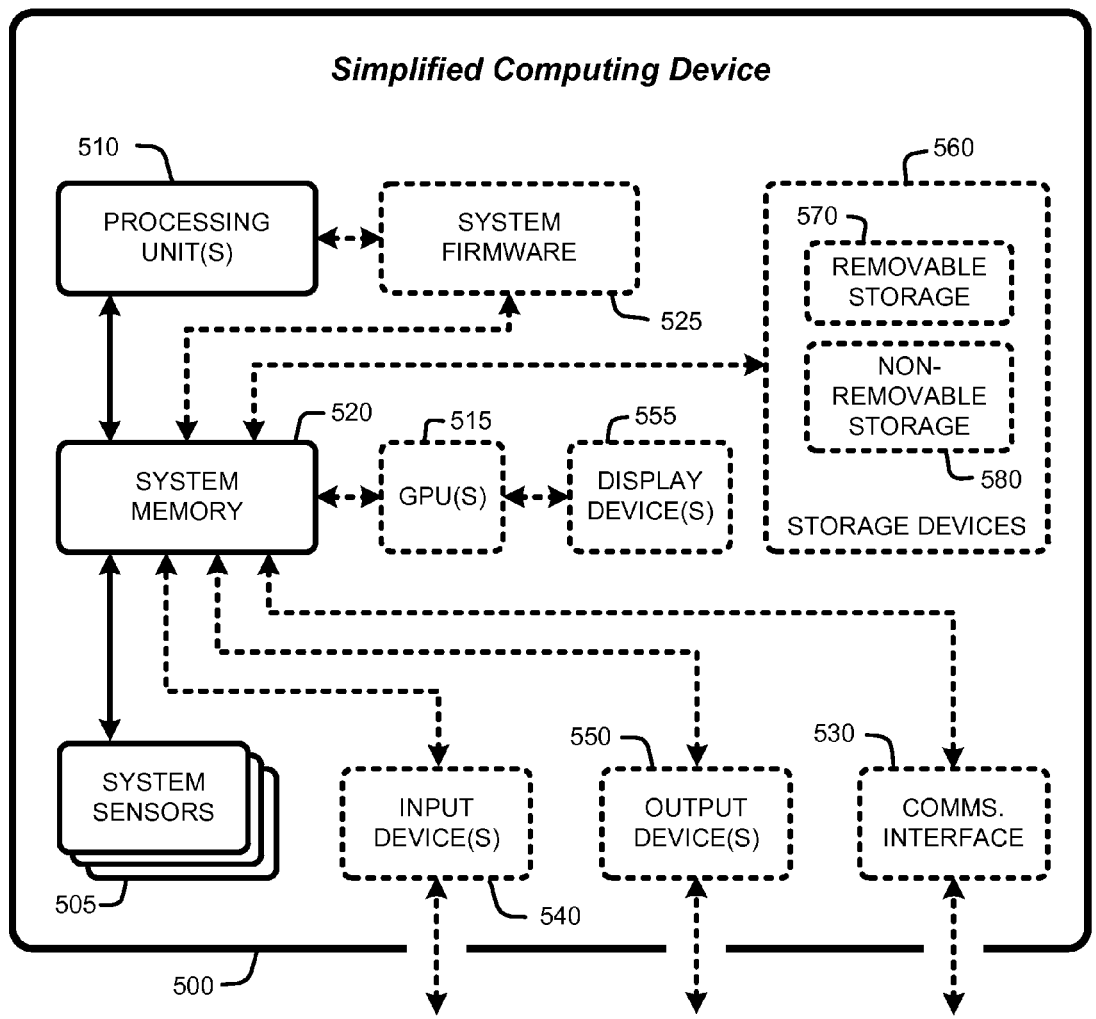
FIG. 5 illustrates a general system diagram depicting a simplified general-purpose computing device having simplified computing and I/O capabilities for use in implementing various embodiments of the Placement Detector, as described herein.

The Placement Detector described herein is operational within numerous types of general purpose or special purpose computing system environments or configurations. FIG. 5 illustrates a simplified example of a general-purpose computing device on which various embodiments and elements of the Placement Detector, as described herein, may be implemented. It should be noted that any boxes that are represented by broken or dashed lines in FIG. 5 represent alternate embodiments of the simplified computing device, and that any or all of these alternate embodiments, as described below, may be used in combination with other alternate embodiments that are described throughout this document.

For example, FIG. 5 shows a general system diagram showing a simplified computing device 500. Examples of such devices operable with the Placement Detector, include, but are not limited to, portable electronic devices, hand-held computing devices, laptop or mobile computers, communications devices such as cell phones, smartphones and PDA's, multiprocessor systems, microprocessor-based systems, set top boxes, programmable consumer electronics, network PCs, minicomputers, audio or video media players, handheld remote control devices, etc. Note also that as discussed above, the Placement detector may be implemented within a carrying case or cover that holds or is otherwise coupled to a wide range of devices or objects.

To allow a device to implement the Placement Detector, the computing device 500 should have a sufficient computational capability and system memory to enable basic computational operations. In addition, the computing device 500 includes one or more sensors 505, including, but not limited to, accelerometers, cameras, capacitive sensors, proximity sensors, microphones, multi-spectral sensors, etc. Further, the computing device 500 may also include optional system firmware 525 (or other firmware or processor accessible memory or storage) for use in implementing various embodiments of the Placement Detector. As illustrated by FIG. 5, the computational capability of computing device 500 is generally illustrated by one or more processing unit(s) 510, and may also include one or more GPUs 515, either or both in communication with system memory 520. Note that that the processing unit(s) 510 of the computing device 500 may be a specialized microprocessor, such as a DSP, a VLIW, or other microcontroller, or can be a conventional CPU having one or more processing cores, including specialized GPU-based cores in a multi-core CPU.

In addition, the simplified computing device 500 may also include other components, such as, for example, a communications interface 530. The simplified computing device 500 may also include one or more conventional computer input devices 540 or combinations of such devices (e.g., pointing devices, keyboards, audio input devices, voice or speech-based input and control devices, video input devices, haptic input devices, touch input devices, devices for receiving wired or wireless data transmissions, etc.). The simplified computing device 500 may also include other optional components, such as, for example, one or more conventional computer output devices 550 (e.g., display device(s) 555, audio output devices, video output devices, devices for transmitting wired or wireless data transmissions, etc.). Note that typical communications interfaces 530, input devices 540, output devices 550, and storage devices 560 for general-purpose computers are well known to those skilled in the art, and will not be described in detail herein.

The simplified computing device 500 may also include a variety of computer readable media. Computer readable media can be any available media that can be accessed via storage devices 560 and includes both volatile and nonvolatile media that is either removable 570 and/or non-removable 580, for storage of information such as computer-readable or computer-executable instructions, data structures, program modules, or other data. By way of example, and not limitation, computer readable media may comprise computer storage media and communication media. Computer storage media refers to tangible computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the Placement Detector described herein, or portions thereof, may be stored, received, transmitted, or read from any desired combination of computer or machine readable media or storage devices and communication media in the form of computer executable instructions or other data structures.

Finally, the Placement Detector described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

The foregoing description of the Placement Detector has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Placement Detector. It is intended that the scope of the invention be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile electronic device, comprising:
    a display screen;
    one or more sensors;
    one or more trained sensor-based probabilistic placement models;
    in response to an inference as to whether the mobile electronic device is currently on a user's person, separately illuminating each of a plurality of different sections of the display screen, each separate illumination causing one of the plurality of different sections of the display screen to emit light while each of the other different sections are not emitting light;
    applying one or more of the sensors to capture separate reflected light inputs for each of the separate illuminations;
    a sensor evaluation module for evaluating the reflected light inputs relative to one or more of the probabilistic models to probabilistically infer whether the mobile electronic device is in an enclosed space; and
    a placement response module for automatically initiating one or more actions in response to the inferred device placement.

2. The mobile electronic device of claim 1 further comprising an input evaluation module for evaluating sensors available to the mobile electronic device, and selecting one or more of the available sensors to provide input to the sensor evaluation module.

3. The mobile electronic device of claim 1 further comprising evaluating reflected inputs received from one or more of the sensors to perform a probabilistic inference of device placement relative to a user.

4. The mobile electronic device of claim 3 wherein the probabilistic inference of device placement comprises a determination as to whether the mobile electronic device is within a user's pocket.

5. The mobile electronic device of claim 4 wherein a capacitive sensor array associated with the mobile electronic device is used to measure a capacitive signal generated in response to near contact with the body of a user through material lining the pocket positioned between the capacitive sensor array and the body of the user.

6. The mobile electronic device of claim 3 wherein the probabilistic inference of device placement comprises a determination as to whether the mobile electronic device is within a user's carrying bag.

7. The mobile electronic device of claim 3 further comprising automatically preventing call initiation when the inferred device placement is a user's pocket or carrying bag.

8. The mobile electronic device of claim 1 wherein the sensors include one or more of a proximity sensor, a light sensor, a capacitive sensor array, and a multi-spectral sensor.

9. The mobile electronic device of claim 1 wherein the mobile electronic device is a carrying case for holding a mobile computing device.

10. A computer-implemented process, comprising using a computing device to perform process actions for:
    in response to an automated inference as to whether the computing device is currently associated with a user's person, receiving sensor data, including data from reflected light resulting from sequential illumination of each of a plurality of different areas of a display screen, from one or more sensors associated with the computing device;
    each sequential illumination causing one of the plurality of different areas of the display screen to emit light while each of the other different areas are not emitting light;
    evaluating the sensor data relative to one or more trained probabilistic models to automatically infer whether a current computing device placement is within an enclosed space; and
    initiating one or more actions in response to the inferred computing device placement.

11. The computer-implemented process of claim 10 wherein the automatic inference of computing device placement further comprises a determination of computing device placement relative to a user.

12. The computer-implemented process of claim 10 wherein the automatic inference of computing device placement comprises a determination as to whether the computing device is within a user's pocket.

13. The computer-implemented process of claim 12 wherein a capacitive sensor array associated with the computing device is used to measure a capacitive signal generated in response to near contact with the body of a user through material lining the pocket positioned between the capacitive sensor array and the body of the user.

14. The computer-implemented process of claim 10 wherein the computing device is a phone and further comprising automatically preventing call initiation when the inferred computing device placement is an enclosed space.

15. The computer-implemented process of claim 10 wherein the computing device is a carrying case for holding other objects.

16. A computer-readable storage device having computer executable instructions stored therein, said instructions causing a computing device to execute a method comprising:
    in response to an automated inference as to whether the computing device is currently associated with a user's person, receiving sensor data, including data from reflected light resulting from separate illumination of different areas of a display screen of the computing device, from one or more sensors associated with the computing device;
    each separate illumination causing one of the plurality of different areas of the display screen to emit light while each of the other different areas are not emitting light;
    evaluating the sensor data relative to one or more trained probabilistic models to automatically infer whether a current computing device placement is within an enclosed space; and
    initiating one or more predefined actions in response to the inferred computing device placement.

17. The computer-readable storage device of claim 16 wherein the automatic inference of computing device placement further comprises a determination of computing device placement relative to a user.

18. The computer-readable storage device of claim 17 wherein the automatic inference of computing device placement comprises a determination as to whether the computing device is within a user's pocket.

19. The computer-readable storage device of claim 18 wherein a capacitive sensor array associated with the computing device is used to measure a capacitive signal generated in response to near contact with the body of a user through material lining the pocket positioned between the capacitive sensor array and the body of the user.

20. The computer-readable storage device of claim 16 wherein the computing device is a phone and further comprising automatically preventing call initiation when the inferred computing device placement is an enclosed space.

\* \* \* \* \*